US008298362B2

(12) United States Patent
Sakai et al.

(10) Patent No.: US 8,298,362 B2
(45) Date of Patent: Oct. 30, 2012

(54) MANUFACTURING METHOD FOR PLASMA DISPLAY PANEL

(75) Inventors: Masahiro Sakai, Kyoto (JP); Keisuke Okada, Osaka (JP); Yayoi Okui, Osaka (JP)

(73) Assignee: Panasonic Corporation, Osaka (JP)

( * ) Notice: Subject to any disclaimer, the term of this patent is extended or adjusted under 35 U.S.C. 154(b) by 126 days.

(21) Appl. No.: 12/990,199

(22) PCT Filed: Feb. 25, 2010

(86) PCT No.: PCT/JP2010/001267

§ 371 (c)(1), (2), (4) Date: Oct. 28, 2010

(87) PCT Pub. No.: WO2010/109770

PCT Pub. Date: Sep. 30, 2010

(65) Prior Publication Data

US 2011/0042001 A1 Feb. 24, 2011

(30) Foreign Application Priority Data

Mar. 25, 2009 (JP) ................................ 2009-073694

(51) Int. Cl.

| | |
|---|---|
| ***B29C 65/00*** | (2006.01) |
| ***B29C 45/00*** | (2006.01) |
| ***B29C 47/00*** | (2006.01) |
| ***B29C 39/02*** | (2006.01) |
| ***B29C 43/02*** | (2006.01) |
| ***B29C 49/08*** | (2006.01) |
| ***B29C 67/00*** | (2006.01) |
| ***B29C 49/00*** | (2006.01) |
| ***B29C 51/00*** | (2006.01) |
| ***B29C 39/14*** | (2006.01) |
| ***B29C 55/00*** | (2006.01) |
| ***B29C 67/20*** | (2006.01) |
| ***B29C 43/10*** | (2006.01) |
| ***B32B 17/00*** | (2006.01) |
| ***B32B 37/00*** | (2006.01) |
| ***C03C 27/00*** | (2006.01) |
| ***B29D 22/00*** | (2006.01) |
| ***B29D 24/00*** | (2006.01) |
| ***B29D 29/00*** | (2006.01) |
| ***B29D 7/00*** | (2006.01) |
| ***B29B 15/00*** | (2006.01) |
| *B28B 21/36* | (2006.01) |
| *B28B 11/08* | (2006.01) |
| *A23P 1/00* | (2006.01) |
| *B29B 11/06* | (2006.01) |
| *B29C 35/00* | (2006.01) |
| *B29C 55/28* | (2006.01) |
| *A01J 21/00* | (2006.01) |
| *A01J 25/12* | (2006.01) |
| *A21C 3/00* | (2006.01) |
| *A21C 11/00* | (2006.01) |
| *A23G 1/20* | (2006.01) |
| *A23G 3/02* | (2006.01) |

(52) U.S. Cl. ........ 156/286; 156/285; 156/104; 156/382; 264/511; 264/526; 264/553; 264/566; 264/568; 264/571; 425/504; 425/546; 425/388; 425/405.1; 425/405.2

(58) Field of Classification Search .................. 156/104, 156/285, 286, 382; 264/511, 526, 553, 566, 264/568, 571; 425/504, 546, 388, 405.1, 425/405.2

See application file for complete search history.

(56) References Cited

U.S. PATENT DOCUMENTS

| | | | | | |
|---|---|---|---|---|---|
| 5,264,712 | A * | 11/1993 | Murata et al. | ................... | 257/71 |
| 6,140,759 | A * | 10/2000 | Sreeram et al. | ............... | 313/493 |
| 6,140,767 | A * | 10/2000 | Sreeram et al. | ............... | 313/582 |
| 6,189,579 | B1 * | 2/2001 | Tanaka | ............................. | 141/8 |
| 6,611,099 | B1 * | 8/2003 | Murata et al. | ................. | 313/582 |
| 2006/0152156 | A1 | 7/2006 | Hasegawa et al. | | |
| 2007/0108905 | A1 * | 5/2007 | Kurauchi et al. | ............. | 313/582 |
| 2009/0102379 | A1 * | 4/2009 | Inoue et al. | ................... | 313/582 |
| 2009/0140652 | A1 | 6/2009 | Fukui et al. | | |
| 2009/0146566 | A1 | 6/2009 | Fukui et al. | | |

FOREIGN PATENT DOCUMENTS

| | | | | |
|---|---|---|---|---|
| JP | 11-329246 | | | 11/1999 |
| JP | 2002-75202 | | | 3/2002 |
| JP | 2002-211129 | | | 7/2002 |
| JP | 2002-231129 | | | 8/2002 |
| JP | 2002-358892 | | | 12/2002 |
| JP | 2002-367520 | | | 12/2002 |
| JP | 2005-005259 | | | 1/2005 |
| JP | 2006-31993 | | | 2/2006 |
| JP | 2007-119833 | | | 5/2007 |
| JP | 2007-265768 | | | 10/2007 |
| JP | 2008-27924 | | | 2/2008 |
| JP | 2008-218359 | | | 9/2008 |
| JP | 2008218539 | A | * | 9/2008 |
| WO | 2009/133660 | | | 11/2009 |

* cited by examiner

*Primary Examiner* — Christopher Schatz
*Assistant Examiner* — Matthew Hoover

(57) ABSTRACT

The present invention aims to provide a manufacturing method for a PDP which allows even high-definition and ultra-high-definition PDPs to demonstrate an excellent image display capability at improved luminous efficiency, by suppressing variation of a discharge gas composition, and by eliminating an impurity gas in a discharge space effectively. To achieve the aim, deterioration of an absorbent material 39 composed of copper ion-exchanged ZSM-5-type zeolite is prevented, by performing both sealing and evacuation steps for the front substrate 2 and back substrate 9 in a non-oxidizing gas atmosphere. This maintains properties of the absorbent material 39 for absorbing the impurity gas without degradation, even if the absorbent material 39 absorbs a Xe gas in a discharge gas introducing step.

10 Claims, 6 Drawing Sheets

MANUFACTURING METHOD FOR PLASMA DISPLAY PANEL

TECHNICAL FIELD

The present invention relates to a manufacturing method for a plasma display panel capable of driving with high efficiency and with low voltage, and in particular to techniques for preventing deterioration of a protective layer and for maintaining the composition of a discharge gas.

BACKGROUND ART

Due to the ongoing development in an image quality of PDPs (Plasma Display Panel) that display an image using gas discharge, full HD (High Definition) panels which are capable of displaying hi-vision (high-definition) broadcasts while maintaining the original quality have been becoming popular. The full HD panels have discharge cells having an extremely smaller size than conventional panels. For example, a 42 inch visual size full HD panel has 1920×1080 discharge cells with a cell pitch of approximately 150 μm. A super hi-vision (ultra-high-definition) panel which is now being planned has approximately 8000×4000 discharge cells in the same visual panel size. An ultra-high-definition panel with a visual size of 100 inches has very small discharge cells with a cell pitch of approximately 100 μm.

In the high-definition and ultra-high-definition PDPs, a cell pitch is made significantly smaller than conventional PDPs. However, the problem with the small cells is that they tend to increase the discharge voltage, thereby decreasing the luminous efficiency.

To solve this problem, a conventional technique increased the luminous efficiency by increasing the ratio of the partial pressure of Xe in a Ne—Xe-based mixture gas, that is to say, a discharge gas, from conventional 10% or so to approximately 30%. However, using a lot of a Xe gas in the high-definition and ultra-high-definition PDPs adopting an MgO layer as the protective layer increases the discharge pressure. With the increased discharge pressure, sputtering amount of the protective layer increases, whereby the product life of the PDP is shortened. Further, due to the increase in the discharge voltage, the luminous efficiency cannot be greatly improved. The increase in the drive voltage also brings about another problem, namely, an increase in cost of the driver.

Also, the high-definition and ultra-high-definition PDPs have a larger surface area for barrier ribs than conventional PDPs, while they do not have a larger panel space for the protective layer. As a result, the phosphor coated area is increased by two to four times compared with the conventional PDPs. It is known that an impurity gas is released from a phosphor layer into the discharge gas over time. Besides, there is a possibility that organic components included in the binder, solvent, or the like which are attributed to a sealing material used in PDPs float in the discharge gas. The problem of such an impurity gas in the PDPs is that it prevents Xe from being excited, leading to an increase in the discharge voltage. If the impurity gas is absorbed by the protective layer, the secondary electron emission characteristics of the protective layer are also degraded. These effects also result in a decrease in luminous efficiency.

One method that has been recently proposed to solve the problem is to use the protective layer for the dielectric mainly composed of a high γ oxide, such as SrO, CaO, and BaO, as disclosed in Patent Literatures 1 and 2, and Non-Patent Literature 1. According to the literatures, since the high γ oxides are more reactive to impurity gases, such as CO, $CO_2$ and, in particular, water vapor, than MgO, the discharge space is evacuated to a high vacuum of $1.0\times10^{-4}$ Pa or less before the discharge gas is introduced in order to remove the impurity gas from the discharge space. The literatures also disclose that steps through a protective layer formation step to a sealing step are performed throughout in a dry atmosphere of air, $N_2$, and $O_2$, thereby preventing the protective layer from reacting with water vapor.

Further, Patent Literature 3 discloses a manufacturing method for PDPs including a protective layer composed of SrO, CaO, and BaO. According to the method, sealing and evacuating steps are performed throughout in a vacuum. The method was conceived in an attempt to prevent the protective layer from reacting with water vapor, CO, and $CO_2$ in the air, while also promoting efficient evacuation of the impurity gas within the panel.

Moreover, Patent Literature 4 discloses a method for reducing discharge voltage by disposing a given absorbent material (i.e. ZSM-5-type zeolite ion-exchanged with copper ion) on the surface of a back panel that faces the discharge space within a PDP and causing the absorbent material to absorb an impurity gas to purify the discharge gas.

Moreover, Patent Literature 5 discloses a technique for disposing ion-exchanged zeolite either in a sealing member for a panel or in vicinity of the inner surface of the sealing member.

CITATION LIST

Patent Literature

[Patent Literature 1]
Japanese Patent Application Publication No. 2002-231129
[Patent Literature 2]
Japanese Patent Application Publication No. 2007-265768
[Patent Literature 3]
Japanese Patent Application Publication No. 2007-119833
[Patent Literature 4]
Japanese Patent Application Publication No. 2008-218359
[Patent Literature 5]
Japanese Patent Application Publication No. 2002-358892

Non-Patent Literature

[Non-Patent Literature 1]
"NHK Giken R&D No. 103, May 2007, pp. 32-39."

SUMMARY OF INVENTION

Technical Problem

In fact, however, it is still difficult to drive high-definition and ultra-high-definition PDPs at high luminous efficiency with use of any of the above-described conventional techniques.

Applying the techniques of Patent Literatures 1 and 2, and Non-Patent Literature 1 to high-definition and ultra-high-definition PDPs indeed allows a certain amount of the impurity gas to be evacuated. Nevertheless, since the high-definition and ultra-high-definition PDPs have a significantly larger surface area for a phosphor layer compared with the conventional panel structures, it is difficult to fully remove the impurity gas. This results in a residual impurity in the panel which might decrease the luminous efficiency. On the other hand, an attempt to fully evacuate the impurity gas requires a prolonged evacuation step which might bring about a severe decrease in the throughput.

The technique recited in Patent Literature 3 also requires large-scale equipment, as a sealing step and an evacuation step are performed throughout in a vacuum. For example, applying the technique to a large panel with a visual size of 50 inches or larger involves a practical problem in terms of the manufacturing cost which is too expensive.

Specifically, the technique recited in Patent Literature 4 is characterized in that the copper ion-exchanged ZSM-5-type zeolite, which is the absorbent material, is arranged in layers between a dielectric layer and a phosphor layer in the back substrate. The technique recited in Patent Literature 5 is characterized in that the absorbent material is disposed on the inner surface of a panel that faces the discharge space. A possible problem with the above techniques is that the absorbent material might be deteriorated under the effect of a high-temperature thermal history during the phosphor baking step, the sealing step, and so on, whereby the absorption characteristics inherent to the material are degraded. Besides, the amount of the impurity gas released from the phosphor layer tends to be large in the case where the sealing step is performed in the atmosphere. For this reason, it is even more difficult to remove the impurity gas by the absorption, particularly when performing the sealing step for high-definition and ultra-high-definition panels in the atmosphere.

Meanwhile, some absorbent materials also absorb a discharge gas, such as Xe, along with an impurity gas. Disposing such absorbent materials on the inner surface of the PDP that faces the discharge space might cause a variation in the discharge gas composition that has been optimized for the optimal image display performance, thereby lowering the performance of the PDP in various aspects. In particular, in a PDP using a discharge gas containing Xe at a relatively low partial pressure, the problem relating the degradation of the discharge characteristics as a result of the absorbent material absorbing Xe is likely to become more apparent than a PDP using a discharge gas containing Xe at a high partial pressure.

Thus, there still is room for improvement in the implementation of the PDPs with high-definition and ultra-high-definition panels.

Further, the above-described problems relating to a residual impurity in the discharge space do not lie only in the PDPs with high-definition and ultra-high-definition panels. There is a demand to solve the same problems in the PDPs with panels conforming to other standards commonly used as well.

The present invention has been conceived in view of the stated problems, and aims to provide a manufacturing method of PDPs that allows even high-definition and ultra-high-definition PDPs to demonstrate an improved luminous efficiency and an improved image display capability, by suppressing variation of the discharge gas, while also by eliminating an impurity gas in the discharge space effectively.

Solution to Problem

In order to solve the above problems, one aspect of the present invention provides the following manufacturing method for a plasma display panel that includes a front substrate having an MgO-containing protective layer on one surface thereof and a back substrate having a phosphor layer on one surface thereof. The manufacturing method includes: a superposing step of superposing one of the front and the back substrates on the other via a sealing material disposed along peripheral edges of the substrates to sandwich barrier ribs, so that the protective and the phosphor layers oppose each other with a predetermined distance therebetween; a sealing step of sealing the substrates together along the peripheral edges by the sealing material to enclose an inner space between the substrates, while bringing the inner space into communication with an outside of the space through at least one exhaust tube provided in one of the substrates; an evacuating step of evacuating the inner space via the exhaust tube after the sealing step; and a discharge gas introducing step of introducing a discharge gas containing a Xe gas into the inner space after the evacuation step, wherein the evacuation step includes: an inserting sub-step of inserting copper ion-exchanged zeolite into the exhaust tube as an absorbent material for absorbing an impurity in the inner space; a heating and evacuating sub-step of evacuating the inner space of a gas through the exhaust tube, while heating the substrates at a predetermined temperature; and a cooling sub-step of cooling the substrates after the heating and evacuating sub-step, and in the evacuation step, at least the heating and evacuating sub-step is performed in a non-oxidizing gas atmosphere in a depressurized state.

Here, in the evacuation step, copper ion-exchanged ZSM-5-type zeolite may be used as the absorbent material.

Furthermore, the absorbent material used in the inserting sub-step may have been caused to absorb a Xe gas in advance.

It is preferable to perform the inserting sub-step in the non-oxidizing gas atmosphere either after the heating and evacuating sub-step before the cooling sub-step or after the cooling sub-step, since this minimizes the exposure of the absorbent material to the evacuated gas.

According to another aspect of the present invention, at least one of (i) an amount t of the absorbent material to be inserted in the inserting sub-step and (ii) a partial pressure p of Xe in the discharge gas to be introduced in the discharge gas introducing step may be determined according to the following formula or a variant thereof: $t=(p_o-p)\ v/p_o\ x$. Here, x denotes a Xe absorption capacity of the absorbent material ($cm^3/g$), $p_o$ denotes a partial pressure of Xe in the discharge gas that is injected into the exhaust tube (kPa), p denotes the partial pressure of Xe in the discharge gas that is to be introduced in a discharge space (kPa), and v denotes a discharge gas volume ($cm^3$) that is to be introduced in the discharge space.

Furthermore, in the heating and evacuating sub-step, the substrates may be heated for a predetermined time at a temperature lower than a softening point of the sealing material. For example, in the heating and evacuating sub-step, the substrates may be heated at a temperature at least 10° C. lower than a softening point of the sealing material.

Furthermore, in the sealing step, a $N_2$ gas atmosphere having a dew point of −45° C. or less may be used as the non-oxidizing gas atmosphere.

Furthermore, prior to the sealing step, the barrier ribs may be installed on the one surface of the back substrate at pitches of 0.15 mm or less, and the phosphor layer may be formed between each of the ribs.

Furthermore, prior to the attaching step, the barrier ribs may be installed on the one surface of the back substrate at pitches that have been determined so that the number of pixels is at least 1920 horizontally and at least 1080 vertically, and the phosphor layer may be formed between each of the ribs.

Furthermore, the discharge gas used in the discharge gas introducing step may contain Xe at a partial pressure of 15% or more.

Advantageous Effects of Invention

An earnest study of the inventors of the present invention revealed that once heated at a prescribed temperature or higher in the atmosphere, an absorbent material, such as copper ion-exchanged ZSM-5-type zeolite, is deteriorated while still keeping an impurity gas absorbed within itself, whereby its absorption characteristics is decreased. The inventors also found that such deterioration is avoided by heating the absorbent material in a non-oxidizing atmosphere. Meanwhile, it is known that the copper ion-exchanged ZSM-5-type zeolite preferentially absorbs an impurity gas when brought in contact with both Xe and impurity gases.

With the stated facts taken into consideration, the present invention provides the following manufacturing method for a PDP. In the evacuation step after the sealing step, at least one exhaust tube into which the absorbent material is inserted is disposed on either a front panel or a back panel in such a manner that the exhaust tube is in communication with the inner space (i.e. discharge space) enclosed by the panels. As the absorbent material, copper ion-exchanged ZSM-5-type zeolite, which absorbs $O_2$, water vapor, CO, $CO_2$, a CH (hydrocarbon) gas, and the others, is used.

Here, by performing at least a heating and evacuating substep in the evacuation step in the non-oxidizing atmosphere, the stated problem, namely that the absorption characteristics of the absorbent material is degraded due to the heating in the atmosphere, is prevented.

Then, when brought in contact with a discharge gas in a discharge gas introducing step, the absorbent material absorbs a certain amount of Xe contained in the discharge gas. As mentioned above, however, the deterioration of the absorbent material due to the heating in the atmosphere is prevented, and therefore the absorbent material is able to emit the absorbed Xe into the discharge space, while also preferentially absorbing an impurity gas in the discharge space so that the impurity gas is removed.

Next, a description is given of the effects of absorbing and removing an impurity gas that are realized by the absorbent material.

Since the absorbent material is inserted into the exhaust tube in communication with the discharge space, it is able to absorb and remove the impurity gas that is released from the phosphor layer to the discharge space in the discharge gas introducing step, a tube-off process, an aging process (in the aging step, in particular) which are performed after the sealing step. The absorbent material can also absorb and remove an impurity gas that is to be generated in the discharge gas while the manufactured product is in use. When deposited on a protective layer containing magnesium oxide, the impurity gas might deteriorate the protective layer and degrade the secondary electron emission characteristics of the protective layer, which leads to an increase in the discharge voltage. However, the present invention realizes an effective removal of a variety of impurity gases ($O_2$, water vapor, CO, $CO_2$, and a CH gas) in the discharge space, by utilizing the absorbent material in the exhaust tube.

According to the present invention, the protective layer is protected against the deterioration due to the adherence of the impurity gas, whereby the discharge voltage is decreased. The removal of the impurity gas in the discharge space also avoids disturbance of the excitation and ionization of Xe in the discharge gas by the impurity gas. Accordingly, by applying the techniques of the present invention in high-definition and ultra-high-definition PDPs, a PDP with a high luminous efficiency which is capable of demonstrating improved image display performance with reduced electric power consumption is achieved, even if the partial pressure of Xe in the discharge gas is increased.

Furthermore, since the impurity gas generated while the PDP is in use can be continuously absorbed and removed by the absorbent material, the initial characteristics is maintained for a long period of time, whereby the life of the PDP is lengthened. These effects are achieved particularly in high-definition and ultra-high-definition PDPs having a relatively large surface area for a phosphor layer.

Furthermore, in the manufacturing method according to the present invention, the absorbent material is inserted into at least one exhaust tube that has previously been used as an evacuation tube, after the completion of the sealing step performed in a relatively high temperature. This means that the absorbent materials do not experience a thermal history in the sealing step or before. As a result, the deterioration of the absorbent material caused by an unnecessary heating is prevented, and the effect of the improved absorption characteristics is maintained.

Moreover, since the absorbent material is inserted into the exhaust tube, there is no need to provide an additional structure in order to dispose the absorbent material. Accordingly, the present invention also has an advantageous effect in terms of cost.

DESCRIPTION OF EMBODIMENTS

The following describes preferred embodiments and examples of the present invention. It is natural that the present invention is not limited to these, and various changes may be made as necessary without departing from the technical scope of the present invention.

Embodiment 1

In Embodiment 1, illustrated is a high-definition PDP 1 with a 42 inch visual size full HD panel of 1920 discharge cells horizontally×1080 discharge cells vertically.

Structure of PDP 1

Figure 1:
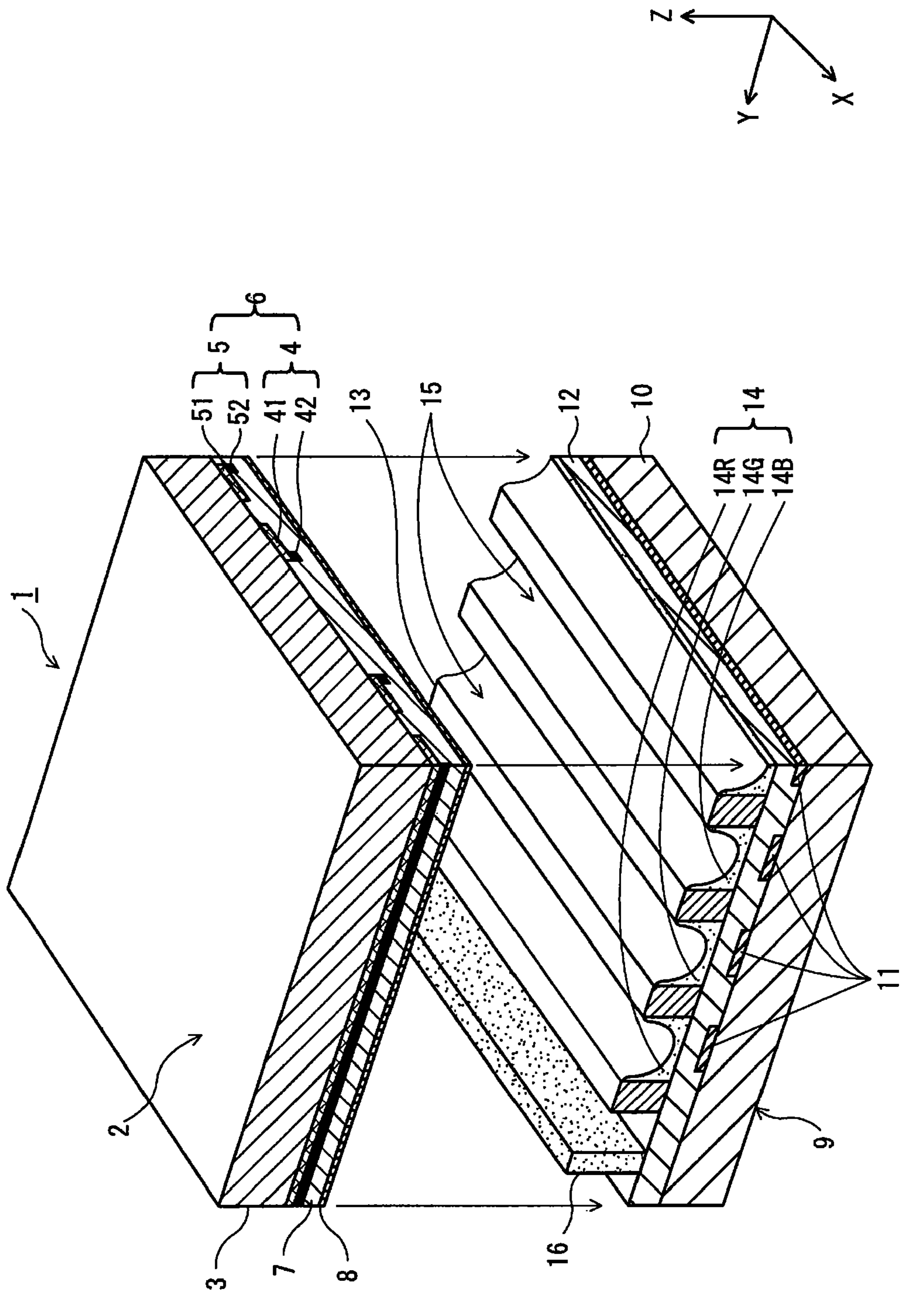
FIG. 1 is a cross-sectional view showing the structure of a PDP in accordance with Embodiment 1 of the present invention.

FIG. 1 is a partial perspective view showing the structure of the AC PDP 1 according to Embodiment 1. The figure partially shows a peripheral portion of the PDP 1 in which a sealing part is located.

The PDP 1 consists mainly of a front substrate (front panel) 2 and a back substrate (back panel) 9 that are sealed together at the peripheral edges thereof in a manner such that the panels 2 and 9 are superposed with a main inner surface of the front panel 2 opposing a main inner surface of the back panel 9.

As shown in FIG. 1, the PDP 1 is composed mainly of a first substrate (front substrate 2) and a second substrate (back substrate 9) that oppose each other with a main surface of the first substrate facing a main surface of the second substrate.

The front substrate 2 includes a front substrate glass 3 as its basis. On the main surface of the front substrate glass 3, a plurality of display electrode pairs 6 (each composed of a scan electrode 4 and a sustain electrode 5) are each disposed in a stripe pattern. In each display electrode pair 6, a given discharge gap (70 μm) is provided.

The scan electrode 4 (sustain electrode 5) in each electrode pair 6 is composed of a transparent electrode 41 (51) and a bus line 42 (52) layered thereon.

The transparent electrodes 41 and 51 are electrodes that are transparent and disposed in a stripe pattern (each transparent electrode is 0.1 μm thick, 100 μm wide). The transparent electrodes 41 and 51 are made of transparent conductive materials of metal oxide, such as indium tin oxide (ITO), zinc oxide (ZnO), and tin oxide ($SnO_2$).

The bus lines 42 and 52 are metal electrodes in a stripe pattern (each metal electrode is approximately 50 μm wide) made of an Ag thick film (2 μm to 10 μm thick), an Al thin film (0.1 μm to 1 μm thick), a Cr/Cu/Cr layered thin film (0.1 μm to 1 μm thick) or the like. These bus lines 52 and 42 reduce the sheet resistance of the transparent electrodes 51 and 41.

The display electrode pairs 6 may be made solely of metal materials, such as Ag, as is similar to address electrodes. The transparent electrodes 51 and 41, as well as the bus lines 52 and 42, may be formed by forming a film by the sputtering method and then patterning the film by etching.

On the entire main surface of the front substrate glass 3 where the display electrode pairs 6 are disposed, a dielectric layer 7 is formed with use of a screen printing method or other method. The dielectric layer 7 is made of low-melting glass (approximately 30 μm thick) that contains lead oxide (PbO), bismuth oxide ($Bi_2O_3$), phosphorus oxide ($PO_4$), or zinc oxide (ZnO) as the principal component.

The dielectric layer 7 has a current limiting function that is peculiar to the AC PDP and used in the AC PDP so that they last longer than the DC PDP.

A protective layer 8 is a thin film with a thickness of approximately 0.5 μm, applied for the purpose of protecting the dielectric layer 7 from ion bombardment at the time of discharge and lowering the firing voltage. The protective layer 8 is formed with MgO material that has high sputtering resistance and a high secondary electron emission coefficient γ. The MgO material further has favorable optical transparency and electric insulation.

On one main surface of the back substrate glass 10 that is the substrate of the back substrate 9, the address (data) electrodes 11 each with a width of 100 μm are formed in a stripe pattern having a fixed gap (95 μm) therebetween. The address electrodes 11 are adjacent to each other in the y direction, and each extends in the x direction. The address electrodes 11 are made up of any one of an Ag thick film (2 μm to 10 μm thick), an Al thin film (0.1 μm to 1 μm thick), a Cr/Cu/Cr layered thin film (0.1 μm to 1 μm thick), or the like.

A dielectric layer 12 with a thickness of 30 μm is disposed on the entire surface of the back panel glass 9 to enclose the address electrodes 11.

Meanwhile, the dielectric layer 12 has a structure similar to the dielectric layer 7. In order to make the dielectric layer 12 serve also as a visible light reflection layer, some particles that reflect visible light, such as $TiO_2$, may be dispersed and mixed in the glass materials.

On the dielectric layer 12, barrier ribs 13 (approximately 100 μm high and 30 μm wide) are each disposed in a stripe pattern by a photolithography method so as to protrude above the gap between the adjacent address electrodes 11. The barrier ribs 13 prevent the occurrence of erroneous discharge or optical crosstalk by partitioning the discharge cells. The shape of the barrier ribs 13 is not limited to the stripe pattern and may be grid, honeycomb, and other shapes.

On the lateral surfaces of two adjacent barrier ribs 13 and on the surface of the dielectric layer 12 between the lateral surfaces, a phosphor layer 14 (one of 14R, 14G, and 14B) corresponding to either red (R), green (G) or blue (B) color is formed with a thickness of 5 μm to 30 μm for color display. Note that the dielectric layer 12 is not essential and that the phosphor layer 14 may directly cover the address electrodes 11.

Figure 4A:
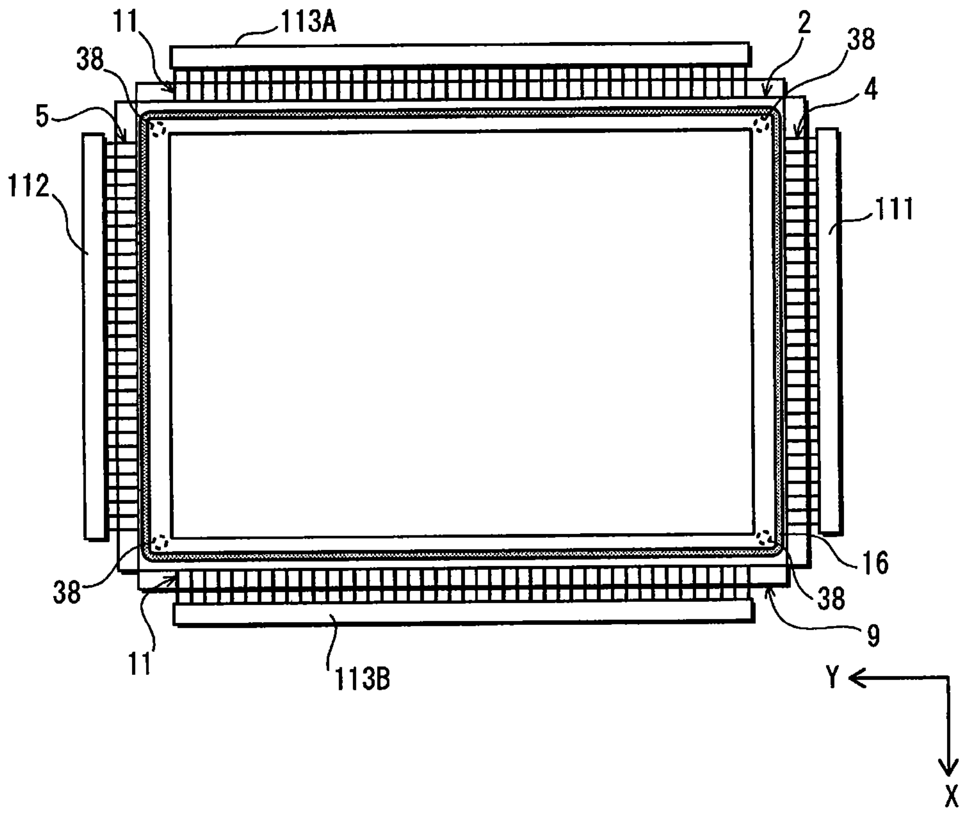
FIG. 4A is a front view showing positions of exhaust tubes.

As shown in FIG. 4A (i.e. the plan view) and FIG. 4B (i.e. the side view), exhaust tubes 38 are disposed in an area of the back substrate 9 that is outside the display area and inside from where the later-described sealing material is applied. In the exhaust tubes 38, given absorbent materials 39 (copper ion-exchanged ZSM-5-type zeolite) are inserted.

The copper ion-exchanged ZSM-5-type zeolite has the properties for absorbing a considerable amount of an impurity gas and therefore suitable as the absorbent material 39.

The front substrate 2 and the back substrate 9 are sealed along the peripheral edges of both the panels by a sealing member 16 containing a given sealing material such that the address electrodes 11 are orthogonal to the display electrode pairs 6 in the respective longitudinal directions. In the discharge space 15 enclosed by both the panels 2 and 9, a discharge gas that is composed of one or more inert gas components selected from a group consisting of He, Xe, Ne, or the like (e.g. a rare gas composed of 100% Xe) is enclosed at a given pressure (30 kPa). In order to improve the luminance of the PDP 1, the ratio of partial pressure of the Xe gas to the discharge gas is preferably set to be 15% or greater.

Between two adjacent barrier ribs 13 is the discharge space 15. Where the adjacent display electrode pair 6 intersects an address electrode 11 via the discharge space 15 corresponds to a discharge cell (also referred to as a "sub-pixel") that contributes to display images. The discharge cell pitch is from 150 μm to 160 μm in the x direction and from 450 μm to 480 μm in the y direction. Three adjacent discharge cells whose colors are red, green and blue compose one pixel (with a square size from 450 μm to 480 μm in the x and y directions).

Although the number of discharge cells in the PDP 1 is 1920 horizontally×1080 vertically, the size of discharge cells may be modified. In this case, it is necessary to appropriately adjust a distance (discharge gap) between a scan electrode 4 and a sustain electrode 5 in each display electrode pair 6, the dielectric constant and film thickness of the dielectric layers 7 and 12, the height and pitch of the barrier ribs 13, and the film thickness of the phosphor layer 14. By doing so, the present invention is applicable to a PDP with a large-sized ultra-high-definition panel having a visual size of 100 inches with 7680 discharge cells horizontally×4096 discharge cells vertically.

Figure 2:
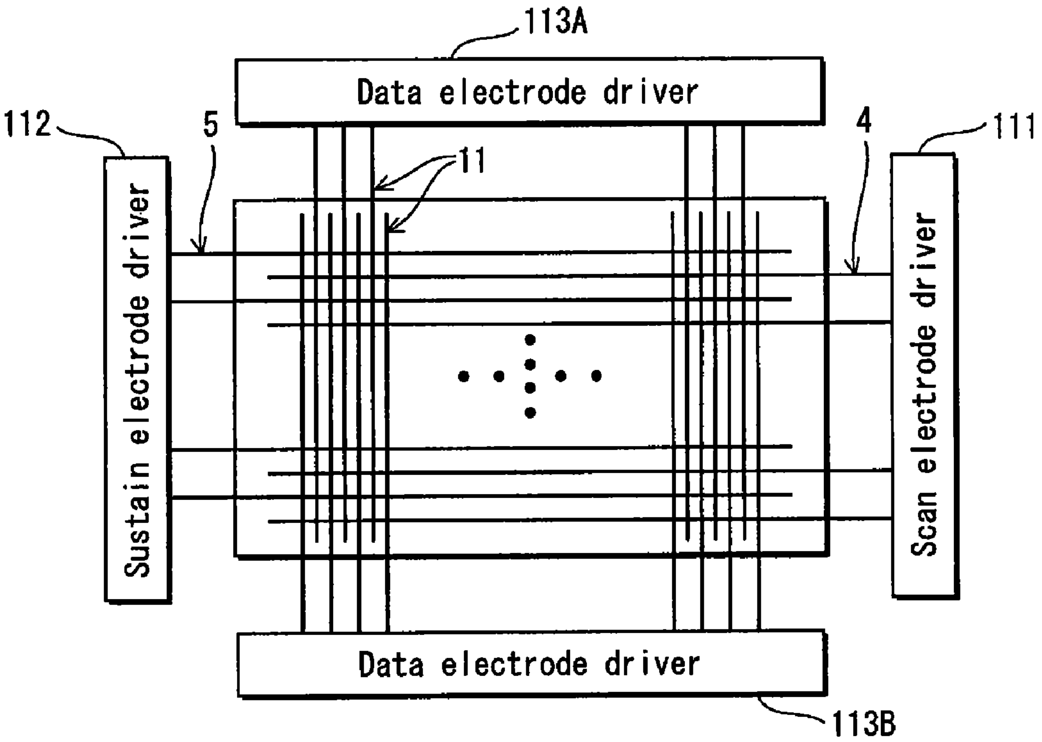
FIG. 2 is a schematic view showing a relation between electrodes and drivers.

As shown in FIG. 2, the scan electrodes 5, the sustain electrodes 4 and the address electrodes 11 are externally connected respectively to a scan electrode driver 111, a sustain electrode driver 112 and address electrode drivers 113A and 113B that function as a driving circuit.

The PDP 1 is driven according to a known driving method by connecting the each of the drivers 111, 112, 113A, and 113B. The Japanese patent application publication No. 2008-116719 may be referred to, for example, since the application discloses that sort of driving method for PDPs.

Effects of Absorbent Material 39

In the PDP 1 with the stated structures, the absorbent materials 39 are inserted into the exhaust tubes 38 that are disposed on the back substrate 9 and are in communication with the discharge space 15. The absorbent materials 39 are inserted into the exhaust tubes 38 without being exposed to a high temperature in the atmosphere during the manufacturing processes of the PDP 1, and therefore the absorption characteristics is not degraded. Further, the absorbent materials 39 are inserted in a heating and evacuating sub-step performed after a sealing step during the production of the PDP, and therefore the absorbent materials 39 do not experience an excessive thermal history. Accordingly, the absorbent materials 39 maintain the favorable absorption characteristics. By inserting such absorbent materials 39 into the exhaust tubes 38, the impurity gas in the discharge space 15 is effectively removed, which is one of main features of the PDP 1.

Thus, the PDP 1 is capable of very effectively absorbing and removing the gas existing in the discharge space 15, namely, the gas generated from the materials of the phosphor layer 14 and the impurity gas containing the organic components of the binder, solvent, or the like which are attributed to the materials (sealing paste) of the sealing member 16. This prevents the problem, namely, that the impurity gas is absorbed by an MgO-containing protective layer 8 and thereby deteriorates the protective layer 8. As a result, the secondary electron emission characteristics of the protective layer is well maintained.

Furthermore, since the excitation and ionization of Xe in the discharge gas is rarely disturbed by the impurity gas, an improved discharge efficiency is achieved even in the high-definition PDP 1. By reducing of the electric power consumption, an optimal image display capability is realized even when the partial pressure of Xe in the discharge gas is increased.

Meanwhile, the absorbent materials 39 are brought in contact with the discharge gas in the discharge gas introducing step. This means that the absorbent materials are inserted into the exhaust tube 38 after absorbing a certain amount of the Xe gas. Nevertheless, since the degradation of absorption characteristics of the absorbent materials 38 is prevented as mentioned above, the absorbed Xe is reemitted into the discharge space 15. Besides, it is known that the copper ion-exchanged ZSM-5-type zeolite preferentially absorbs an impurity gas in the discharge space 15 than it does a Xe gas. Accordingly, even when the absorbent materials 39 that have absorbed Xe are inserted into the exhaust tubes 38, Xe gases are continuously emitted from the absorbent materials 39 into the discharge space 15, whereas the impurity gas is efficiently absorbed and removed by the absorbent materials 39.

It is well-known to use copper ion-exchanged ZSM-5-type zeolite as the absorbent material, as is disclosed in the above-mentioned Patent Literatures 4 and 5. With the following means, however, the present invention provides an advantageous effect that cannot be found conventionally. In the present invention, an attention is focused on the problem that the absorbent material is deteriorated due to heating in the atmosphere, and against this, an adjustment is made to enable the absorbent material to demonstrate improved properties for absorbing the impurity gas, by introducing the absorbent material into an exhaust tube while maintaining the optimal absorption characteristics.

In addition, in some conventional PDPs, a getter is provided in an exhaust tube. The getter, however, might be crushed into powder gradually while the PDP is in use, which adversely leads to dispersion of the powder in the discharge space. In contrast, in the present invention, the absorbent material 39, such as copper ion-exchanged ZSM-5-type zeolite, maintains a stable configuration even after absorbing the impurity gas and cannot be powdered. Accordingly, the present invention greatly differs from the conventional technique that uses the exhaust tube into which the getter is provided.

Effect of Present Invention and PDP Cell Size

In PDPs having ordinary sized cells, luminous efficiency increases as the partial pressure of Xe in a discharge gas is increased. On the other hand, in high-definition and ultra-high-definition PDPs, as the partial pressure of Xe in a discharge gas simply increases, the discharge voltage increases. This leads to cumulated ionization of Xe, resulting in only a little increase in a luminous efficiency.

However, according to the experiments conducted by the inventors of the present invention, the following is acknowledged. By applying the present invention to a PDP in which a discharge gas containing Xe at a partial pressure of 15% or more is introduced, the discharge gas is purified since the impurity gas existing in the discharge space 15 is optimally absorbed and removed by the absorbent material, which also leads to a considerable decrease in the discharge voltage. In other words, by applying the present invention, even a high-definition PDP is enabled to provide improved luminance with reduced electric power consumption and achieve improved luminous efficiency due to an increase in the partial pressure of Xe. Furthermore, since the impurity gas generated during driving is absorbed by the absorbent material, the initial characteristics of the PDP is maintained for a long period of time, resulting in a longer product life.

As mentioned above, the present invention has a wide range of application in PDPs with a cell size of high-definition and ultra-high-definition, in addition to conventional PDPs with an ordinary cell size. It is particularly advantageous to apply the present invention to high-definition and ultra-high-definition PDPs (having a cell pitch of 150 μm or less and a large occupied volume for members facing the discharge space, in particular) with a view to driving the PDPs at particularly improved luminance efficiency for a long time as mentioned above.

Next, a manufacturing method for a PDP according to the present invention is illustrated.

Manufacturing Method for PDP

Figure 3:
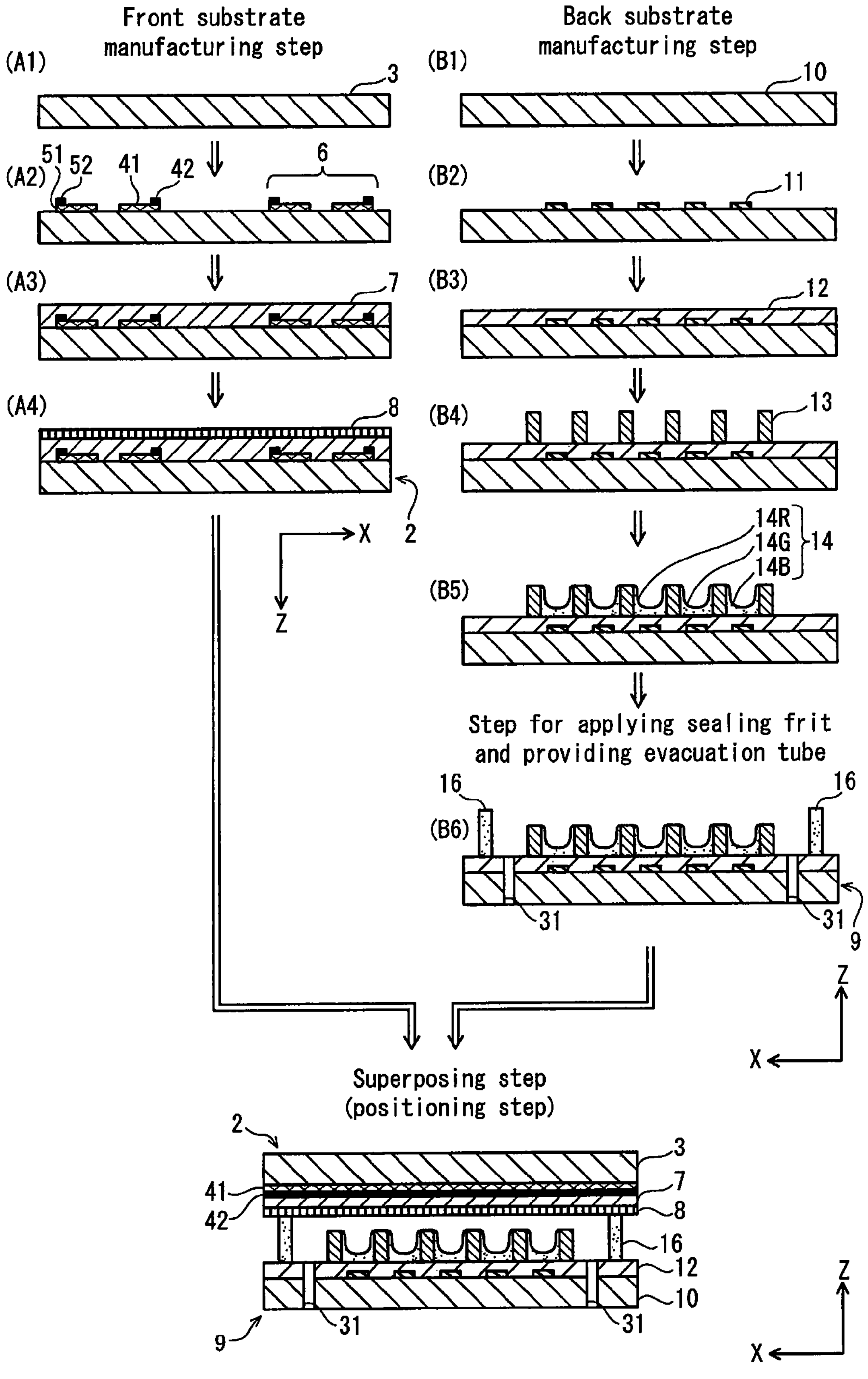
FIG. 3 is a flowchart showing the manufacturing procedures of the PDP.

A description is given below in conjunction with a flowchart of FIG. 3 showing the outline of the manufacturing method for the PDP 1.

Figure 5:
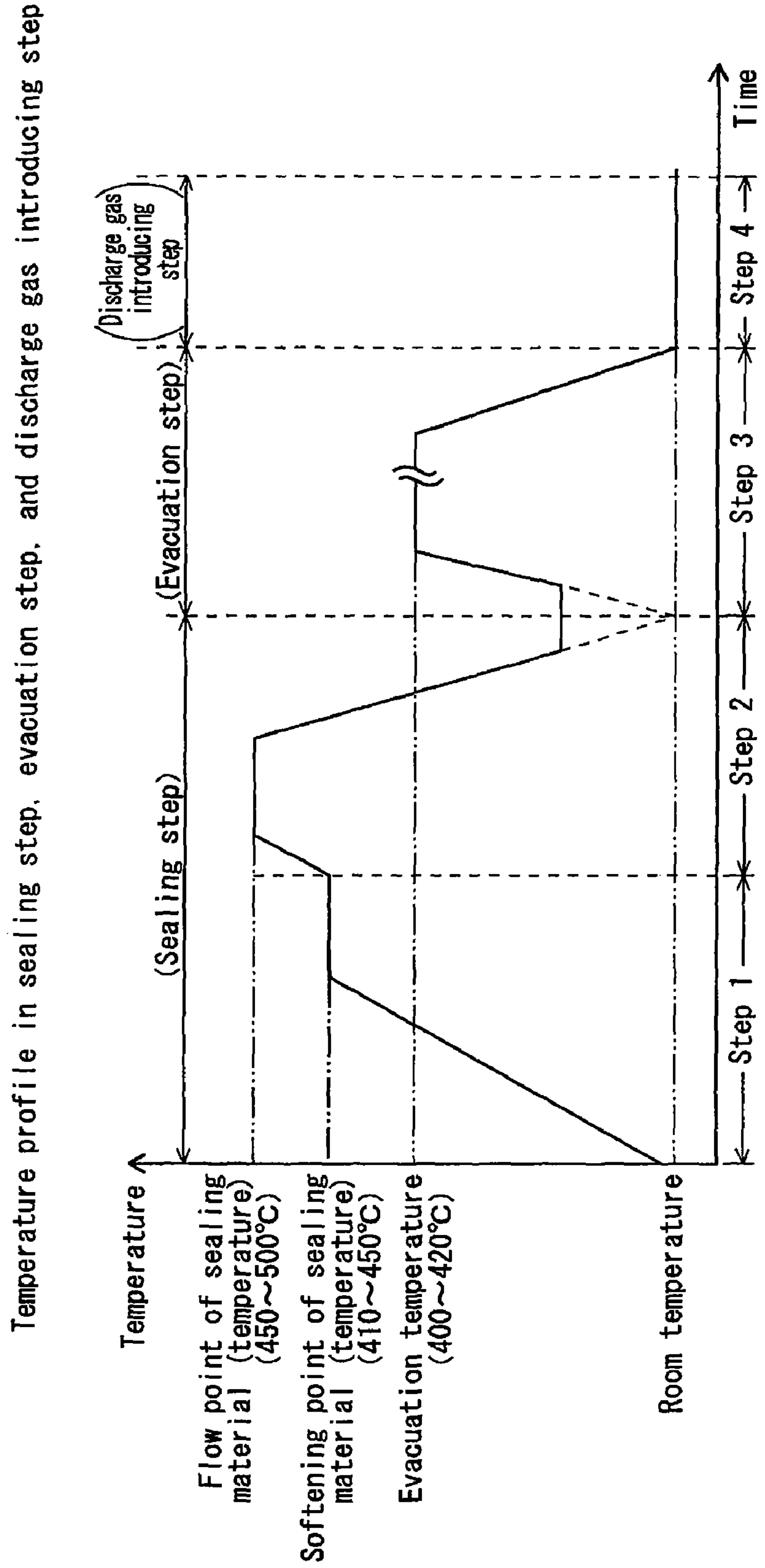
FIG. 5 shows temperature profiles in a sealing step, an evacuation step, and a discharge gas introducing step.

To begin with, in the manufacturing processes, the front substrate 2 is manufactured (steps A1 to A4), and the back substrate 9 is separately manufactured (steps B1 to B6). One of the manufactured two substrates 2 and 9 is superposed on the other in a predetermined positional relation (superposing step and positioning step). Subsequently, the sealing step, the evacuation step, and the discharge gas introducing step as shown in FIG. 5 are sequentially performed to complete the PDP 1.

The main feature of the present invention lies in the point that the given absorbent material is inserted into the exhaust tubes disposed on the back substrate in a stage after the sealing step and before the evacuation step. Apart from the point, the manufacturing method of the present invention is substantially same as conventional manufacturing methods for PDPs. So now, a description is given firstly of the step for manufacturing the front substrate and the step for manufacturing the back substrate, and secondly of the stated steps in the details.

Front Substrate Manufacturing Step The front substrate glass 3 is manufactured with a panel glass that is made of soda-lime glass and has a thickness of approximately 1.8 mm (step A1). The panel glass is manufactured by a well-known float method, for example. The manufactured panel glass is cut into a predetermined size to obtain the front substrate glass 3.

Subsequently, the display electrode pairs 6 are formed on a main surface of the front substrate glass 3 (step A2). In this embodiment, with use of transparent electrode materials, such as ITO, $SnO_2$, and ZnO, a film is formed on the front substrate glass 3 in a stripe pattern with a final thickness of 0.1 μm and a width of 100 μm by a sputtering method. Thus, transparent electrodes 41 and 51 are formed.

Then, with use of an Ag material, a film is formed on the transparent electrodes 41 and 51 in a stripe pattern with a final thickness of 7 μm and a width of 50 μm by the sputtering method. Thus, bus lines 42 and 52 are formed.

Besides Ag, other metal material that can be used to make the bus lines 42 and 52 include Pt, Au, Al, Ni, Cr, tin oxide and indium oxide. The bus lines 42 and 52 may also be made of a Cr/Cu/Cr layer.

Thus, the display electrode pairs 6 are formed.

Subsequently, a paste is applied on the display electrode pairs 6 by a screen printing method. The paste has been prepared by mixing lead-based or lead-free low-melting glass or $SiO_2$ powder whose softening point is 550° C. to 600° C. with organic binder, such as butyl carbitol acetate. The paste is then baked at a temperature ranging from 550° C. to 650° C. Thus, the dielectric layer 7 with a final thickness of approximately 30 μm is formed (step A3). As the lead-free low-melting glass, bismuth-oxide-based low-melting glass may be used. As the glass materials, the bismuth-oxide-based low-melting glass may be prepared to contain, for example, 60 weight % (wt %) of bismuth oxide ($Bi_2O_3$), 15 wt % of boric oxide ($B_2O_3$), 10 wt % of silicon oxide ($SiO_2$), and 15 wt % of zinc oxide (ZnO).

The MgO-containing protective layer 8 is next formed by a vacuum deposition method, the sputtering method, an EB deposition method, or the like (step A4) on the surface of the dielectric layer 7. According to the EB deposition method, by distributing $O_2$ at 0.1 sccm in an EB apparatus using an MgO pellet, the protective layer 8 having a thickness of approximately 1.0 μm is obtained.

In addition, on the surface of the protective layer 8, high crystallinity MgO powder having better exoelectron emission properties may be dispersed (see Japanese Patent Application Publication No. 2008-027924). In the case where the MgO powder is utilized, because of its excellent exoelectron emission properties, a further improvement in the discharge efficiency of the PDP 1 is expected.

The above processes are used to complete the front substrate 2.

Back Substrate Manufacturing Step

Like the step A 1 mentioned above, the back substrate glass 3 made up of soda-lime glass with a thickness of approximately 1.8 mm is manufactured (step B1). Through holes 31 for receiving the exhaust tubes 38 are each provided at four corners of the back substrate 9 outside the display area.

On one main surface of the back substrate glass 10, a conductive material composed mainly of Ag is applied with the screen printing method in a stripe pattern at given intervals (approximately 95 μm pitch in this embodiment) to form the address electrodes 11 each having a thickness of some micrometers (e.g. approximately 5 μm) (step B2). The address electrodes 11 are made up of a metal, such as Ag, Al, Ni, Pt, Cr, Cu, and Pd, or a conductive ceramic, such as metal carbide or metal nitride. The address electrodes 11 may be made of a combination of these materials, or may have a layered structure of these materials as necessary.

Following that, a glass paste with a thickness of approximately 20 μm to 30 μm made of the lead-based or lead-free low-melting glass or $SiO_2$ material is applied all over the back substrate glass 10 on which the data electrodes 11 have formed by the screen printing method, and baked to form the dielectric layer 12 (step B3).

Subsequently, the barrier ribs 13 in a stripe pattern are formed on the dielectric layer 12 (step B4). The barrier ribs 13 are formed as follows. A paste containing a glass particle composed mainly of bismuth oxide, a filler, and a photosensitive resin are applied on the dielectric layer 12 according to a dye coat method. The paste is then exposed using a given pattern by the photolithography method, and then etched. As an example, each barrier rib 13 is shaped in a belt approximately 100 μm high and approximately 30 μm wide. A pitch between adjacent barrier ribs 13 is set to be 95 μm, as is same as the previously formed address electrodes 11.

After the barrier ribs 13 are formed, phosphor ink containing one of red (R), green (G) and blue (B) phosphors commonly used for the AC PDP is applied to the lateral surface of each barrier rib 13 and on the exposed surface of the dielectric layer 12 between adjacent barrier ribs 13. The phosphor ink is then dried and baked to form the phosphor layers 14 (14R, 14G, and 14B) (step B5).

Following are examples of phosphors of the red, green and blue applicable for the formation of the phosphor layers 14. Naturally, the present invention is not limited to these examples.

Red phosphor—(Y, Gd) $BO_3$: Eu

Green phosphor—$Zn_2SiO_4$: Mn, or a mixture of $Zn_2SiO_4$: Mn and $YBO_3$: Tb

Blue phosphor—(Ba, Sr) $MgAl_{10}O_{17}$: Eu

It is known that if borate phosphors, namely (Y, Gd) $BO_3$: Eu and $YBO_3$: Tb are unused, degassing during the heating of the phosphors in the sealing and evacuation steps is relatively reduced. In this case, time spent for evacuation may be reduced and the evacuation temperature may be lowered.

In the formation of each phosphor layer 14, the phosphor ink in which given phosphor particles are dissolved is prepared. The phosphor ink is manufactured by mixing, for example, 30 mass percent of phosphor having an average particle diameter of 2 μm, 4.5 mass percent of ethylcellulose having an mass average molecular weight of approximately 200,000, and 65.5 mass percent of butyl carbitol acetate. Furthermore, it is preferable to adjust the viscosity of the mixture to be approximately 2000 cps (2 Pa·s) in order to improve adherence of the phosphor ink to the barrier ribs 13.

The resultant phosphor ink is applied over the lateral surface of the barrier ribs 13 and over the dielectric layer 12 according to a known method such as a meniscus method or a line jet method. The ink is dried and then baked for 10 minutes at 500° C., thus forming the phosphor layers 14.

The above processes are used to complete the back substrate 9.

With respect to the back substrate 9, for the sake of the later-performed sealing step, a sealing material paste 16 is disposed along the peripheral edges of the substrate 9 as follows, and then the substrate 9 is pre-baked (step B6).

The pre-baking helps eliminate most of the organic components contained in the sealing material paste, while also maintaining a given hardness of the paste.

Application Step and Pre-Baking Step for Sealing Material

To begin with, the resin binder and solvent is mixed into the given sealing material (a composition of low-melting glass mainly composed of bismuth oxide and lead oxide, and a filler) to obtain the sealing material paste.

As the resin binder, well-known materials, such as an acryl resin, nitrocellulose, ethylcellulose, may be used. As the solvent, well-known materials, such as isoamyl acetate and terpineol, may be used, too. The amount of the resin binder to be applied may be adjusted so that a ratio of the resin binder to the solvent is, for example, approximately 5 wt %.

The softening point of the sealing material at which the sealing material starts to be softened is preferably in a range of 410° C. to 450° C. The sealing temperature of the sealing member is preferably in a range of 450° C. to 500° C. As an example of the sealing material in harmony with the above temperatures, there is a mixture of a low-melting glass material containing bismuth oxide or lead oxide, cordierite, and a filler, such as $Al_2O_3$ and $SiO_2$. As for the ratio of the filler and the low-melting glass, 70 volume % of low-melting glass composed mainly of bismuth oxide or lead oxide and 30 volume % of filler is preferably mixed.

In the case where the bismuth-oxide-based glass is used as a main component in the low-melting glass material, the specific composition of the low-melting glass (after production of the PDP) may be for example: 67 to 90 wt % of $Bi_2O_3$; 2 to 12 wt % of $B_2O_3$; 0 to 5 wt % of $Al_2O_3$; 1 to 20 wt % of ZnO; 0 to 0.3 wt % of $SiO_2$; 0 to 10 wt % of BaO; 0 to 5 wt % of CuO; 0 to 2 wt % of $Fe_2O_3$; 0 to 5 wt % of $CeO_2$; and 0 to 5 wt % of $Sb_2O_3$.

On the other hand, in the case where the lead-oxide-based glass is used as a main component in the low-melting glass material, the specific composition of the low-melting glass (after production of the PDP) may be for example: 65 to 85 wt % of PbO; 10 to 20 wt % of $B_2O_3$; 0 to 20 wt % of ZnO; 0 to 2.0 wt % of $SiO_2$; 0 to 10 wt % of CuO; 0 to 5 wt % of $Fe_2O_3$.

After the stated adjustment, the obtained sealing material paste is applied (disposed) along the peripheral edges of the back substrate 9 around the display area of the back substrate 9 (application step for sealing material paste). The application step for sealing material paste is preferably performed in a relatively high temperature (higher than the softening point temperature of the sealing material) for the purpose of volatilizing and removing the solvent, for example.

The pre-baking process is illustrated next. First of all, a heating furnace is heated from a room temperature to a pre-baking temperature. Here, the temperature rise is sustained until the maximum temperature in the pre-baking step is reached. As mentioned above, the maximum temperature is set to be higher than the softening point of the low-melting glass included in the sealing material. The maximum temperature is maintained for a given time period (e.g. ten to thirty minutes), thus executing the pre-baking. Subsequently, the temperature of the back substrate 9 is dropped to the room temperature.

Generally speaking, a pre-baking step is to burn the solvent and binder component contained in the sealing material paste, thereby causing carbon dioxide ($CO_2$) to be generated, and then remove the generated $CO_2$. However, the step involves a risk that the glass component of a sealing material is foamed as a result of a rapid generation of carbon dioxide if the atmosphere contains a lot of oxidizing gas, such as oxygen. This might lead to imperfect sealing. Since the imperfect sealing eventually might cause a leakage of a discharge gas, the risk must be avoided.

In order to prevent the glass component from being foamed, it is preferable to utilize weakly-oxidizing atmosphere (e.g. atmosphere containing nitrogen with 1% or less of an oxygen partial pressure) and non-oxidizing atmosphere (e.g. atmosphere containing nitrogen) as the pre-baking atmosphere. In the case where an acryl resin is used as a resin component of the sealing material paste or where $Bi_2O_3$-based glass and $P_2O_5$-based glass is used in the sealing material, the pre-baking step is preferably performed in a non-oxidizing atmosphere using $N_2$ or the like.

Although in the above example the pre-baking temperature for the sealing member 16 is set to be higher than the softening point of the sealing material, the present invention is not limited to the example.

The problem with the pre-baking at a temperature greater than the softening point of the sealing member is that a residual of the binder component in the sealing material can be kept inside the softened low-melting glass in the sealing material, thereby turning the binder component into a tar component which is less volatile. The tar component is generally released into the inner space as a result of the sealing material being melted in the sealing step, which is performed at a flow temperature of the sealing material at which the sealing material starts to gain fluidity. The released tar component adheres to the phosphors and MgO of the protective layer, thereby degrading the secondary electron emission characteristics of the protective layer. This can cause problems, such as an increase in the discharge voltage and a decrease in the luminance of phosphors. In the case where these problems should be prevented in particular, the pre-baking temperature is preferably set to be smaller than the softening point of the sealing material so as to suppress the generation of a tar component.

Meanwhile, if the absorbent material has sufficient absorption properties to compensate the contamination of the phosphor layer 14 and the protective layer 8 by the tar component (e.g. in the case where a relatively large amount of copper ion-exchanged ZSM-5-type zeolite is used as the absorbent material 39, and the tar component may be fully removed), the pre-baking temperature may be set to be higher than the softening point temperature even when a tar component is generated.

Thus, it should be noted that the pre-baking temperature should be adjusted in accordance with various conditions, such as type and amount, of the sealing material. For example, in the case where the low-melting glass composed mainly of lead-oxide-based glass is utilized, it is preferable to set the pre-baking temperature to be 10 to 20° C. lower than the softening point of the sealing material for preventing the generation of a tar component. In the setting of the pre-baking temperature, a glass-transition point (Tg) may also be referred to, along with the softening point of the sealing material.

Superposing Step

One of the manufactured front substrate 2 and back substrate 9 is superposed on the other so that display electrode pair 6 intersects address electrodes 11 that faces the display electrode pair 6. In this process, a clip (which is not shown) having a spring structure is held between the substrates 2 and 9 so as to prevent the substrates 2 and 9 from being misaligned with each other. The superposition is performed so that, in each pixel, a middle point of a wall of a barrier rib 13 in the x direction, a middle point (Tg) of a scan electrode 4, and a middle point of a sustain electrode 5 coincide with each other.

Exhaust Tube Mounting Step

As the exhaust tube 38, a glass tube having an inside diameter of approximately 3 mm and a length of approximately 80 mm, with one end portion enlarged to have an inside diameter of approximately 9 mm, is used.

Figure 4B:
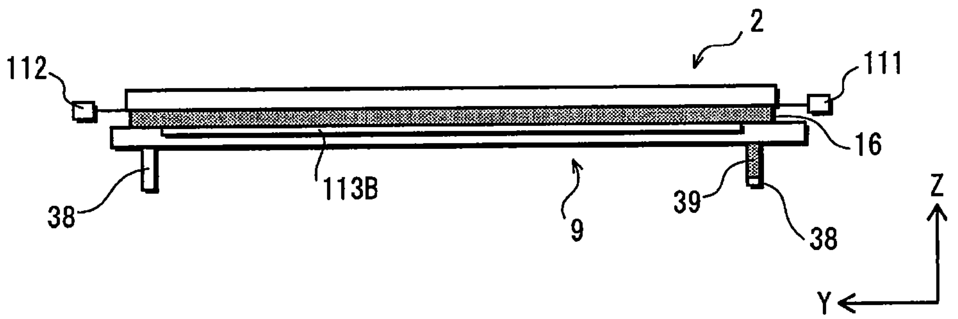
FIG. 4B is a side view showing positions of exhaust tubes.

As shown in FIG. 4A and FIG. 4B, through holes 31 for receiving the exhaust tubes 38 are each provided at four corners of the back substrate 9 outside the display area. The peripheries of four through holes 31 are each spot-faced so as to receive the four exhaust tubes, respectively. The exhaust tubes are installed in the holes 31 with the enlarged end portions of the exhaust tubes 38 being abutted against the back substrate 9. At a periphery of each exhaust tube 38 on the back substrate 9, a sealing material is also disposed for holding the exhaust tube 38. In this condition, each exhaust tube 38 is temporarily jointed to the back glass 9 with a clip. Note that, in this condition, a main surface of the back glass 9 faces upwards and the exhaust tube 39 stands vertically.

The number of the exhaust tubes 38 is not limited to four, and is at least one. Further, the mounting position of the exhaust tubes 38 is not limited to the above, and they may be mounted along the periphery of the display area at given intervals. By increasing the number of the exhaust tubes 38, a quicker evacuation is realized. By inserting an absorbent material into each exhaust tube 38, an impurity gas would be removed more effectively.

In addition, the exhaust tubes 38 may be mounted even on the front substrate 2 only if mounted outside the image display area.

Further, although the exhaust tubes 38 are mounted right before the sealing step in the above example, it is suffice to perform the mounting prior to the sealing step.

Sealing Step

FIG. 5 shows the sealing step, evacuation step, and gas introducing step.

In the sealing step, the following processes are performed in the non-oxidizing gas atmosphere: increasing the room temperature to a sealing temperature which is higher than the flow temperature of the sealing material; maintaining the increased temperature for a predetermined time; and thereafter lowering the temperature down to the softening temperature of the sealing material. As the non-oxidizing gas, a gas which contains at least one of $N_2$ and Ar and which adversely affects neither the substrates 2 and 9 nor the absorbent material 39 is preferably used.

A description is given of an example of the processes. To begin with, the superposed substrates 2 and 9 are put into a heating furnace and the furnace is evacuated to 10 Pa or less with an evacuation pump. The evacuation removes an oxidizing gas, thereby preventing a problem that the protective layer is oxidized and deteriorated.

After the evacuation, a non-oxidizing gas (Ar or $N_2$) having a dew point of −45° C. or less is introduced into the heating furnace. Ar is in particular preferable since Ar is less inert and less expensive than $N_2$. It is sometimes no problem with the gas being mixed with an extremely small amount of oxygen (or atmosphere). The residual oxygen concentration is, however, preferably limited to 100 ppm or less.

Meanwhile, residual water vapor may also act as an oxidizing gas and cause deterioration of the protective layer. By using the non-oxidizing gas with a dew point of −45° C. or less, however, residual water vapor is decreased.

Subsequently, a temperature is increased from the room temperature to about the softening point of the sealing material, and the increased temperature is maintained for one hour (this completes step 1).

Then, an interior temperature of the heating furnace is further increased from around the softening point of the sealing material to a sealing temperature (of approximately 490° C.) which is higher than the flow temperature. The increased temperature is maintained for one hour. The temperature rise rate is adjusted so that the panel glass is not broken due to an interior temperature distribution under the effect of a rapid temperature rise. The stated heating process seals the front substrate 2 and back substrate 9 with the sealing member 16, while also fixing the exhaust tubes 38 on the back substrate 9. Subsequently, the temperature is cooled down to around the room temperature. Both the substrates 2 and 9 are then taken out from the heating furnace (this completes step 2).

Although not shown in the above example for processes, in the sealing step, it is also possible to provide a temperature holding time for removing the binder component in the process for increasing the temperature of both the substrates 2 and 9 to the sealing temperature which is higher than the flow temperature of the sealing material.

Evacuation Step

In the present invention, the evacuation step includes an absorbent material inserting sub-step, a heating and evacuating sub-step, and a cooling sub-step. In the following example, these sub-steps are sequentially performed.

<Absorbent Material Inserting Sub-Step>

Firstly, the absorbent material 39 is inserted into at least one of four tubes mounted on the back substrate 9 (i.e. an exhaust tube 38 mounted in the lower right corner as shown in FIG. 4, in this example) (absorbent material inserting sub-step). In the insert sub-step, an attention is paid so that the absorbent material 39 is fully exposed to the discharge space 15 within the panel. As the absorbent material 39, any material having a relatively high softening point is recommended and copper ion-exchanged ZSM-5-type zeolite is well-suited.

<Heating and Evacuating Sub-Step>

Both the substrates 2 and 9 are placed inside the heating furnace. The exhaust tubes 38 are connected with a turbo-molecular pump. By driving the pump, the inner space enclosed by both the substrates 2 and 9 is depressurized and evacuated to as small as $1\times10^{-3}$ Pa or less. Note that, in the case where copper ion-exchanged ZSM-5-type zeolite is used as the absorbent material 39, the evacuation is preferably continued until the pressure reaches 10 Pa or less so as to prevent the problem that the zeolite is deteriorated in reaction to an impurity component when heated.

Meanwhile, the absorption activity of the absorbent 39 is lowered at this stage since the absorbent material 39 has already absorbed a gas during exposure to the atmosphere. However, by heating the absorbent material 39 at a predetermined temperature in a non-oxidizing gas atmosphere in the later-described heating and evacuating sub-step, the absorbent 39 reemits the absorbed component, thus regaining absorption activity. The term "absorption activity" herein refers to an ability to absorb other gas (i.e. an impurity gas as mentioned above) but a discharge gas, such as Ne and Xe, filled in the discharge space.

When heated in the atmosphere (under an oxidizing atmosphere), copper ion-exchanged ZSM-5-type zeolite reacts with an impurity in the atmosphere and therefore the properties might be deteriorated. This makes it difficult to recover absorption activity at a later stage. Embodiment 1 was conceived in view of the stated problems, and prevents such deterioration of absorbent material 39, by avoiding heating the absorbent material 39 at a predetermined temperature or higher in the oxidizing atmosphere, and by performing heating which is also required in the sealing step in the non-oxidizing gas atmosphere.

After the evacuation ends, an interior atmosphere of the furnace is maintained as the non-oxidizing gas atmosphere, while still keeping the depressurized condition. Then, the temperature of the heating furnace is increased to 400° C. which is lower than the softening point of the sealing material 16, and maintained for four hours.

In the heating and evacuating sub-step with use of the non-oxidizing atmosphere, an impurity gas is evacuated from the inner space enclosed by both the substrates 2 and 9, and at the same time, a gas which has been absorbed by the absorbent material 39 at this stage is left from the absorbent material 39 so that the absorption characteristics is recovered. The heating temperature in the heating and evacuation sub-step is preferably maintained at 10° C. or less which is lower than a softening point of the sealing member 16 for a predetermined time, and then lowered to the room temperature. It should be noted, however, that the temperature must be higher than a temperature at which the absorbent material 39 is activated and also higher than a glass-transition point of the low-melting glass which composes the sealing material.

<Cooling Sub-Step>

After the heating and evacuating sub-step is performed for a predetermined time as mentioned above, a cooling sub-step is performed to cool both the substrates 2 and 9 down to around the room temperature (this completes step 3).

By going through the stated evacuation step, the absorbent material 39 is kept in the exhaust tube 38 while maintaining an excellent absorption activity. Accordingly, in the following steps and even after the product is shipped, the absorbent material 39 may absorb and remove various types of impurity gas which is expected to be continuously generated in the discharge space 15.

When the heating and evacuating sub-step is performed after the absorbent material inserting sub-step, the heating and evacuation is performed through the exhaust tube 38 into which the absorbent material 39 has been already inserted. In this case, it is preferable to device ways of handling the absorbing material 39, for example, by placing both the substrates 2 and 9 with the back substrate 9 side up and its main surface kept in a horizontal position to position the absorbing material 39 at the bottom of the exhaust tube 38 under its own weight, thereby preventing the absorbing material 39 from sucked by the pump easily.

The amount of the absorbent material 39 and the number of the exhaust tubes 38 to each of which the absorbent material 39 is inserted may be appropriately adjusted, according to the absorption capacity of the absorbent material 39, the size and cell size (namely, the surface areas and amounts of the phosphor layer 14 and sealing material 16, from both of which an impurity gas is released) of the PDP to be manufactured, a concentration of oxygen residing inside the heating furnace at the beginning of the sealing step, the degree of vacuum attained in the evacuation step, and the heating temperature in the evacuation step.

In addition, the absorbent material inserting sub-step may be performed between the heating and evacuating sub-step and the cooling sub-step, or after the cooling sub-step. By devising ways of preventing exposure of the absorbent material 39 to the evacuation gas as much as possible, the amount of an impurity gas that is to be preliminarily absorbed by the absorbent material 39 at the time of insertion is reduced. Further, by delaying the timing for inserting the absorbent material 39 into the exhaust tube 38 as much as possible in the evacuation step, an impurity gas emitted from the absorption material 39 in the heating and evacuating sub-step is prevented from flowing into the discharge space 15 due to the delay.

Discharge Gas Introducing Step

After the cooling sub-step is finished, a given discharge gas is introduced into the discharge space 15 via the exhaust tube 38. As an example of the discharge gas, a Xe gas with a purity of 99.995% or more is solely used, and the total pressure in the discharge space 15 right after the discharge gas is introduced is set to be 30 kPa, in this embodiment. After the discharge gas is introduced, a tip of the exhaust tube 38 is sealed by a gas burner (tube-off process) (this completes step 4). The exhaust tube 38 after the sealing is approximately 10 mm long. Note that the exhaust tube 38 is left attached to the PDP 1. Since the absorbent material 39 is exposed to the discharge gas in the discharge gas introducing step, the absorbent material 39 absorbs a certain amount of the Xe gas.

Meanwhile, the discharge gas is not limited to the above composition with a Xe gas. In consideration of the luminance characteristics of the PDP to be manufactured, a Ne—Xe-based mixture gas, a Ne—Xe—Ar-based mixture gas, and such may also be used.

Furthermore, the pressure of the discharge gas in the discharge space 15 is appropriately adjusted in accordance with the mixing ratio of Xe, for example. For instance, it has been found that the pressure should be relatively increased, as the mixing ratio of Xe is low, because it is preferable in terms of luminous efficiency.

Furthermore, regarding the amount of Xe in the discharge gas, it is possible to introduce more Xe with taking it consideration that the absorbent material 39 is to absorb the Xe gas in the discharge gas. A detailed description is further given of this point later in Embodiment 2.

Aging Step

Next, an aging step is performed for a panel formed as above. The aging step is to drive the panel for a predetermined time until the discharge starting voltage in each cell are stabilized and uniform.

In this step, since a current is first applied to the panel, it is relatively likely that the phosphor layer generates an impurity gas. In the present invention, however, since the exhaust tube 38 into which the absorbent material having an excellent absorption capacity is disposed, such an impurity gas is immediately absorbed and removed from the discharge space 15.

All the above-described steps are used to complete the PDP 1.

Copper Ion-Exchanged ZSM-5-Type Zeolite

Copper ion-exchanged ZSM-5-type zeolite, which is inserted into the exhaust tube 38 in the heating and evacuating sub-step, is produced by the following exemplary method.

Specifically, the method for the production includes successive steps of: an ion exchange step using an ion exchange solution containing a copper ion and an ion having buffering properties (step 1); a cleaning step of cleaning copper ion-exchanged ZSM-5-type zeolite (step 2); and a drying step (step 3).

In the ion exchange step (step 1), the aqueous solution which contains a conventional compound, such as copper acetate, copper propionate, or copper chloride, may be used as copper ion-containing solution, and copper acetate is favorable for increase in the amount of gases absorbed and for stronger absorption.

An ion having the buffering properties to buffer the ionic dissociation equilibrium in the copper ion-containing solution, such as an acetate ion or a propionate ion, may be used in the ion exchanger solution. Among these ions, an acetate ion is preferably used in order to achieve large absorption capacity in a low pressure region, and an acetate ion derived from ammonium acetate is even more preferably used.

The ion exchange solution containing the copper ion and an ion having buffering properties may be obtained by preparing respective ion-containing solutions and mixing the solutions or by dissolving respective solutes in the same solvent.

Ion exchange processing is performed, by adding a zeolite material to the prepared ion exchange solution and mixing the two. The number of ion exchange treatments, the concentrations of the copper ion solution and the buffer solution, the period and the temperature of ion exchange, and others are not particularly limited, but the ion exchange rate is preferably in the range of 100% to 180% for obtaining an excellent absorption capacity. It is even more preferable for the ion exchange rate to be ranged between 110% and 170%. The term “ion exchange rate” above refers to a calculated value, based on an assumption that a $Cu^{2+}$ ion is exchanged with two $Na^+$ ions, and the calculated rate may be more than 100% when copper is ion-exchanged as a $Cu^+$ ion.

The processing then moves on to the cleaning step (step 2) where the ion-exchanged zeolite material is cleaned. Distilled water is preferably used for cleaning in the cleaning step in order to prevent contamination of an undesired ion.

After the ion-exchanged zeolite material is fully cleaned, the zeolite is dried in the drying step (step 3). To prevent deterioration due to overheating, the zeolite is preferably dried under a relaxed condition at a temperature of less than 100° C. It is also possible to dry the zeolite in an atmosphere in a depressurized state at the room temperature.

The above-described steps are used to produce copper ion-exchanged ZSM-5-type zeolite.

Embodiment 2

A description is given of the PDP according to Embodiment 2 of the present invention, focusing on differences between Embodiment 1.

The main feature of the PDP according to Embodiment 2 lies in a point in the manufacturing method that a larger amount of the Xe gas is introduced, by setting the pressure of a discharge gas introduced into the discharge space 15 in the discharge gas introducing step to be higher for a certain degree (i.e. pressurization), in anticipation of an amount of the Xe gas introduced in the discharge space 15 to be absorbed by the absorbent material 39. By this means, the PDP according to Embodiment 2 fully addresses the problem, namely, that the luminance characteristics varies as a result of a Xe gas in the discharge gas composition being absorbed by the absorbent material and thereby varying the composition and pressure of the discharge gas.

Assume that Xe absorption capacity of the absorbent material 39 is x ($cm^3/g$), the total volume of the discharge gas in the discharge space 15 is v ($cm^3$), the partial pressure of Xe to be set in the discharge space 15 is p (kPa), and the partial pressure of Xe in the discharge gas right after the discharge gas is introduced into the discharge space is $p_o$ (kPa). Then, the amount t (g) of the absorbent materials 39 to be inserted into the exhaust tubes 38 is represented by Formula 1.

$$t=(p_o-p)v/p_o x \qquad \text{[Formula 1]}$$

Accordingly, by modifying Formula 1, the partial pressure of Xe in the discharge gas right after the discharge gas is introduced into the discharge space in the discharge gas introducing step is obtained by Formula 2.

$$p_o=pv/(v-tx) \qquad \text{[Formula 2]}$$

By setting the partial pressure $p_o$ of Xe in the discharge gas right after the discharge gas is introduced according to Formula 2, the variations of the discharge gas composition and pressure as a result of a Xe gas being absorbed by the absorbent material are fully suppressed.

Meanwhile, in the PDP according to Embodiment 2 also, the discharge gas is not limited to a Xe gas and a Ne—Xe-based mixture gas, a Ne—Xe—Ar-based mixture gas, and such may also be used. In any case, if there is a possibility that a discharge gas component is absorbed by the absorbent material 39, the stated effect is achieved by applying Embodiment 2.

Embodiment 3

The PDP according to Embodiment 3 differs from Embodiment 1 only in a point that the absorbent material 39 which has been caused to absorb a Xe gas in advance is used in the absorbent material inserting sub-step. This reduces the amount of the Xe gas in the discharge space 15 to be absorbed by the absorbent material 39 after the discharge gas is introduced, thereby preventing the variation of the discharge gas composition due to the absorbent material, thus maintaining a stable discharge characteristics of the PDP.

In the case where copper ion-exchanged ZSM-5-type zeolite is used as the absorbent material 39, it is possible to cause the absorbent material 39 to absorb a Xe gas by exposing the material 39 to Xe gases by heating in a non-oxidizing atmosphere. Upon exposure to the atmosphere, however, the material 39 preferentially absorbs an impurity gas in the atmosphere and emits the Xe gas, as mentioned above. Accordingly, in Embodiment 3, the material 39 is inserted into the exhaust tube 38 without being exposed to the atmosphere after the absorbent material 39 is caused to absorb the Xe gas, and the exhaust tube 38 is sealed immediately after the discharge gas introducing is performed. In Embodiment 3, it is therefore required that the absorbent material inserting sub-step is performed in an atmosphere isolated from the air (e.g. within a chamber filled with a $N_2$ gas or an Ar gas).

PERFORMANCE CONFIRMATORY EXPERIMENT

Performance confirmatory experiments were carried out in order to confirm the effects of the present invention. The methods and results are shown below.

Experiment 1

A small sized PDP with a same cell size and a same specification as the PDP of Embodiment 1, and with a display area of two inches was manufactured as Example 1 and evaluated.

Manufacturing Example 1

The manufacturing method is specifically described below. To begin with, in the front substrate manufacturing step, by distributing $O_2$ at 0.1 sccm by means of an EB apparatus using an MgO pellet as a deposition source, a deposited film having a thickness of approximately 1 μm was obtained, thus forming the protective layer 8.

A through hole for receiving the exhaust tube 38 was provided at one point in the back substrate 9.

In the application and the pre-baking steps for sealing material, as the materials of the sealing material, a filler mix composed of $Al_2O_3$, $SiO_2$, cordierite, and glass mainly consisting of $Bi_2O_3$ were used and the softening point was adjusted to be 430° C. The sealing material was pre-baked in the atmosphere at 490° C.

Subsequently, the exhaust tube 38 was positioned at the through hole provided in the back substrate using a clip and fixed with a given sealing material.

In the step 1 of sealing step (i.e. step 1 in the temperature rise profile shown in FIG. 5), the inside of heating furnace was depressurized to 10 Pa or less. Then, a $N_2$ gas having a dew point of −45° C. was filled at a rate of 3 slm. The temperature in the heating furnace was increased to a softening point (430° C.) of the sealing material, whereas the filling of the $N_2$ gas was also continued. In the step 2 of sealing step (i.e. step 2 in the temperature rise profile shown in FIG. 5), the temperature was increased to a sealing temperature (490° C.), whereas the filling of the $N_2$ gas was also continued. The increased temperature in the heating furnace was maintained for one hour and later lowered to the room temperature.

Before the evacuation step, 0.1 g of copper ion-exchanged ZSM-5-type zeolite was inserted into the exhaust tube 38 and thus the exhaust tube 38 was formed.

In the evacuation step, as shown in the step 3 of the profile of FIG. 5, the inner space of the panel is evacuated by depressurizing the space to $1\times10^{-4}$ Pa via the exhaust tube 38 using an evacuation device. During the evacuation, the temperature was again increased to 410° C. which is 20° C. lower than the softening point of sealing material and maintained for approximately four hours. Then, the temperature in the heating furnace was lowered to the room temperature, whereas the evacuating was continued.

In the discharge gas introducing step, as shown in the step 4 of the profile of FIG. 5, a 100% Xe gas was introduced at a pressure of 30 kPa at the room temperature.

Manufacturing Comparative Example 1

A PDP with an overall structure similar to Embodiment 1 yet with no absorbent material 39, for which the sealing step was performed in the atmosphere, was manufactured as Comparative Example 1.

Manufacturing Comparative Example 2

A PDP with an overall structure similar to Embodiment 1 yet with no absorbent material 39, for which the sealing step was performed in a $N_2$ atmosphere having a dew point of −45° C. or less after depressurization like Example 1, was manufactured as Comparative Example 2.

<Observed Results>

Figure 6:
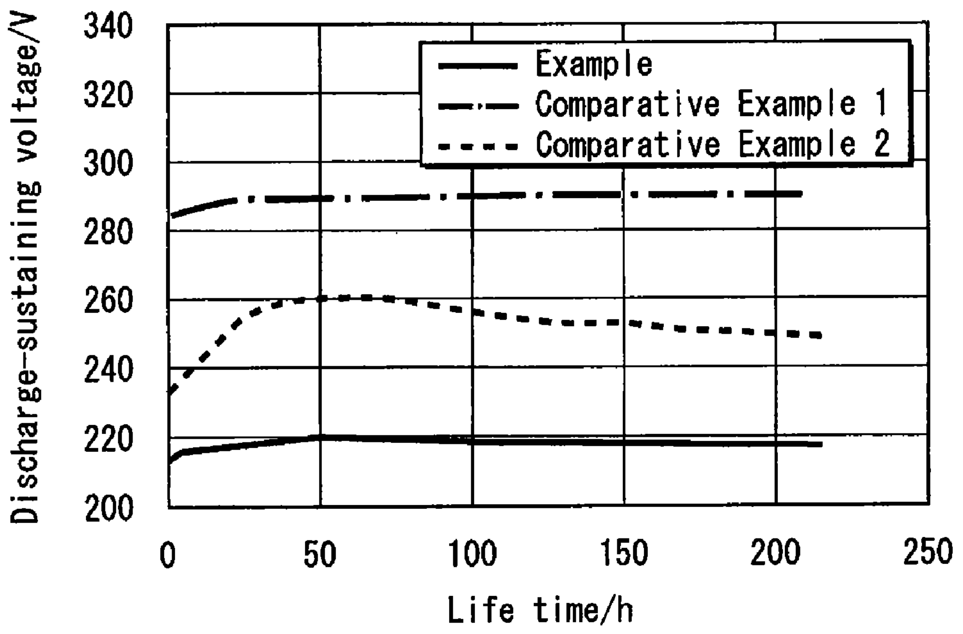
FIG. 6 shows life fluctuations of discharge-sustaining voltages in PDPs according to Example of the present invention and other Comparative Examples.

Fluctuations of discharge-sustaining voltages over elapsed life time were measured on each of the PDPs manufactured as above. The measurement results are shown in FIG. 6. In the figure, measured values with less fluctuations indicate more stable discharge-sustaining voltages.

As can clearly be seen from the results shown in FIG. 6, at an initial stage (when the life time is zero hour), the discharge-sustaining voltage of the PDP according to Example 1 is lower than the PDP according to Comparative Example 1. The discharge-sustaining voltage values according to Comparative Example 1 are high at approximately 290 V, whereas the discharge-sustaining voltage values according to Example 1 are suppressed to less than 220 V. It can also be seen that Comparative Example 2 shows higher discharge-sustaining voltage than Example 1, although not as low as Comparative Example 1.

An evaluation is next made on characteristics of the voltage fluctuations over the elapsed life time. The discharge-sustaining voltage according to Comparative Example 2 dramatically increases from 230 V observed at an initial driving stage to as high as more than 260 V. After that, the voltage gradually decreases to approximately 250 V. In this way, it was found that in Comparative Example 2 the discharge-sustaining voltage was relatively high and further that the voltage was not stabilized. The reason of these is perhaps that, since the absorbent tube used in Example 1, impurity gases attributed to the phosphor layer and the like were generated in the discharge space over the elapsed driving time and then absorbed by the protective layer, resulting in a decrease in the secondary electron emission characteristics of the protective layer.

On the other hand, regarding Comparative Example 1, it can also be seen that the initial high value of discharge-sustaining voltage (approximately 290 V) is maintained, while the fluctuations over time are less than Comparative Example 2. Although the variations in the luminance are smaller, however, Comparative Example 1 has difficulty in driving the PDP at a reduced consumption power. This is perhaps because that the discharge-sustaining voltage was increased compared with Example, since an oxygen-deficiency which is effective for decreasing the discharge-sustaining voltage was eliminated in the protective layer due to the sealing step performed in the atmosphere.

Thus, it is acknowledged that, in contrast to Comparative Examples 1 and 2, Example 1 suppresses the discharge-sustaining voltage to the lowest and stabilizes the voltage values over time. The reason of this is perhaps that the secondary electron emission characteristics of the protective layer was fully maintained, since an impurity gas within the discharge space was effectively removed even after the PDP was manufactured by disposing the absorbent tube into which an absorbent material with no thermal history was inserted.

Meanwhile, in the Example, only one exhaust tube was disposed in the PDP and the evacuation step was performed via the absorbent tube using the exhaust tube.

However, the same or more advantageous effect is thought to have been achieved if additional two tubes were disposed besides the one tube so that an exhaust tube and absorbent tubes were separately provided.

Experiment 2

Next, the PCP according to Embodiment 2 was manufactured as Example 2 and performance confirmatory experiments were carried out.

Manufacturing Example 2

The overall structure and manufacturing method of the PDP were similar to Example 1 and only the absorbent material inserting sub-step and discharge gas introducing step were performed as follows.

Manufacturing Example 2 and Comparative Example 3

Assume that the desired partial pressure of Xe to be set in the discharge space 15 is 6.00 (kPa). The Xe absorption capacity of the absorbent material 39 is approximately 10 ($cm^3/g$) with the partial pressure of Xe being 6.00 (kPa). In the case of the above small sized panel with a display area of two inches, v is approximately (0.2 $cm^3$).

Accordingly, providing that the amount t of the absorbent material to be inserted is 0.0006 (g), the partial pressure $p_a$ of Xe in the discharge gas right after the discharge gas is introduced into the discharge space 15 is calculated using Formula 2 as follows.

$$6.00\times0.2/(0.2-10\times0.0006)=6.19\ (\text{kPa})$$

In the case where a Ne—Xe-based gas containing Ne at a partial pressure of 90% and Xe at a partial pressure of 10% is used, the total pressure $p_{an}$ of the discharge gas right after the discharge gas is introduced into the discharge space 15 is calculated as follows.

$$p_{all}=(6.19/10)\times100=61.9\ (\text{kPa})$$

In Experiment 2, according to the above conditions, a discharge gas with a total pressure $p_{all}$ was introduced to manufacture the PDP as Example 2.

Manufacturing Example 3

A PDP was manufactured as Example 3 in which the overall structure was again similar to Example 2 but an absorbent material was not inserted into an exhaust tube and the mixing ratio of Xe and the total pressure of the discharge gas were set to be 20% and 60.0 kPa, respectively.

The discharge starting voltages and luminance efficiency measured with respect to Example 2 and Comparative Example 3 are shown in Table 1.

TABLE 1

| | Presence of Absorbent Material | Charged Pressure (kPa) | Partial Pressure of Xe after Absorbed (kPa) | Discharge-sustaining Voltage (V) | Luminance Efficiency (lm/W) |
|---|---|---|---|---|---|
| Ex. 2 | Yes | 61.9 | 6.00 | 193 | 1.30 |
| Comp Ex. 3 | No | 60.0 | 6.00 | 192 | 1.05 |

<Observed Results>

As can be seen from Table 1, compared with Comparative Example 3, luminance efficiency is significantly improved in Example 2, with the discharge-sustaining voltage maintained nearly equal. This is perhaps because that a larger amount of the Xe gas was introduced in advance in anticipation of absorption of the Xe gas by the absorbent material 39, whereby a favorable discharge gas composition was maintained, resulting in the excellent luminance efficiency.

Meanwhile, although Embodiment 2 describes a method for controlling the partial pressure of Xe by controlling the total pressure, it is easily conceived that the similar effect is also achieved by adjusting the mixing ratio of Xe in the Ne—Xe mixture gas to be injected.

The described observations confirmed the superiority of the present invention.

<Other Remarks>

Each of the above embodiments and examples illustrates a structure in which copper ion-exchanged ZSM-5-type zeolite is used as the absorbent material 39. However, the absorbent material 39 used in the present invention is not limited to a ZSM-5 type and may be any zeolite ion-exchanged with copper ion. For example, copper ion-exchanged MFI-type, BETA-type, and MOR-type zeolite may be used. Further, one or more of these may be selected and mixed to use as the absorbent material 39. Moreover, other absorbent material and additive may be added to the absorbent material 39 that is composed mainly of the above-mentioned types of zeolite (50 wt % or more).

INDUSTRIAL APPLICABILITY

The manufacturing method for a PDP according to the present invention can be used as a method for manufacturing a gas discharge panel which is capable of a performance of a particularly high-resolution image display at low power consumption in manufacturing television apparatuses, display apparatuses for computers, and others in transportation, public facilities, homes, and so forth. In any of the usages, the present invention is effective since it reduces an initial discharge-sustaining voltage as well as fluctuations over time in the discharge-sustaining voltage. The present invention is specifically applicable to next generation PDPs of high-definition and has a high industrial applicability.

REFERENCE SIGNS LIST

| | |
|---|---|
| 1 | PDP |
| 2 | front substrate (front panel) |
| 3 | front substrate glass |
| 8 | protective layer |
| 9 | back substrate (back panel) |
| 10 | back substrate panel |
| 13 | barrier rib |
| 16 | sealing portion |
| 31 | through hole for receiving an exhaust tube |
| 38 | exhaust tube |
| 39 | absorbent material |

The invention claimed is:

1. A manufacturing method for a plasma display panel that includes a front substrate having an MgO-containing protective layer on one surface thereof and a back substrate having a phosphor layer on one surface thereof, the manufacturing method comprising:

a superposing step of superposing one of the front and the back substrates on the other via a sealing material disposed along peripheral edges of the substrates to sandwich barrier ribs, so that the protective and the phosphor layers oppose each other with a predetermined distance therebetween;

a sealing step of sealing the substrates together along the peripheral edges by the sealing material to enclose an inner space between the substrates, while bringing the inner space into communication with an outside of the space through at least one tube provided in one of the substrates;

an evacuating step of evacuating the inner space via the tube after the sealing step; and a discharge gas introducing step of introducing a discharge gas containing a Xe gas into the inner space after the evacuation step, wherein the evacuation step includes:

an inserting sub-step of inserting copper ion-exchanged zeolite into the tube as an absorbent material for absorbing an impurity in the inner space;

a heating and evacuating sub-step of evacuating the inner space of a gas through the tube, while heating the substrates at a predetermined temperature; and a cooling sub-step of cooling the substrates after the heating and evacuating sub-step, and in the evacuation step, at least the heating and evacuating sub-step is performed in a non-oxidizing gas atmosphere in a depressurized state, and at least one of (i) an amount t of the absorbent material to be inserted in the inserting sub-step and (ii) a partial pressure p of Xe in the discharge gas to be introduced in the discharge gas introducing step is determined according to the following formula or a variant thereof:

$$t=(p_o-0)v/P_2x,$$

where x denotes a Xe absorption capacity of the absorbent material ($cm^3/g$), $p_2$ denotes a partial pressure of Xe in the discharge gas that is injected via an exhaust tube (kPa), p denotes the partial pressure of Xe in the discharge gas that is to be introduced in a discharge space (kPa) and v denotes a discharge gas volume ($cm^3$) that is to be introduced in the discharge space.

2. The manufacturing method of claim 1, wherein in the evacuation step, copper ion-exchanged ZSM-5-type zeolite is used as the absorbent material.

3. The manufacturing method of claim 1, wherein the absorbent material used in the inserting sub-step has been caused to absorb a Xe gas in advance.

4. The manufacturing method of claim 1, wherein the inserting sub-step is performed in the non-oxidizing gas atmosphere either after the heating and evacuating sub-step before the cooling sub-step or after the cooling sub-step.

5. The manufacturing method of claim 1, wherein in the heating and evacuating sub-step, the substrates are heated for a predetermined time at a temperature lower than a softening point of the sealing material.

6. The manufacturing method of claim 1, wherein in the heating and evacuating sub-step, the substrates are heated at a temperature at least 10° C. lower than a softening point of the sealing material.

7. The manufacturing method of claim 1, wherein in the sealing step, a N2 gas atmosphere having a dew point of −45° C. or less is used as the non-oxidizing gas atmosphere.

8. The manufacturing method of claim 1, wherein prior to the sealing step, the barrier ribs are installed on the one surface of the back substrate at pitches of 0.15 mm or less, and the phosphor layer is formed between each of the ribs.

9. The manufacturing method of claim 1, wherein prior to the attaching step, the barrier ribs are installed on the one surface of the back substrate at pitches that have been determined so that the number of pixels is at least 1920 horizontally and at least 1080 vertically, and the phosphor layer is formed between each of the ribs.

10. The manufacturing method of claim 1, wherein the discharge gas used in the discharge gas introducing step contains Xe at a partial pressure of 15% or more.

* * * * *